Sept. 27, 1966 F. M. MAYES ET AL 3,275,805

DATA TRANSMISSION SYSTEM

Original Filed Sept. 21, 1956 4 Sheets-Sheet 1

INVENTORS
FRED M. MAYES &
BY JACK W. JONES

Busser, Smith & Harding
ATTORNEYS

INVENTORS
FRED M. MAYES &
JACK W. JONES
BY
ATTORNEYS

DATA TRANSMISSION SYSTEM

Original Filed Sept. 21, 1956

INVENTORS
FRED M. MAYES &
JACK W. JONES
BY
Brown, Scull & Hanley
ATTORNEYS

INVENTORS
FRED M. MAYES &
JACK W. JONES
BY
ATTORNEYS 3,275,805
Patented Sept. 27, 1966

3,275,805

DATA TRANSMISSION SYSTEM

Fred M. Mayes and Jack Weir Jones, Richardson, Tex., assignors to Sun Oil Company, Philadelphia, Pa., a corporation of New Jersey Original application Sept. 21, 1956, Ser. No. 611,291, now Patent No. 3,034,217, dated May 15, 1962. Divided and this application Mar. 5, 1962, Ser. No. 177,554
7 Claims. (Cl. 235—61.11)

This is a division of our co-pending application, Serial No. 611,291, filed September 21, 1956, now Patent No. 3,034,217, granted May 15, 1962.

This invention relates to data transmission systems of the type in which data is transmitted in the form of coded electrical impulses. As example of the use of such sustem is disclosed in said parent application. This apparatus involves the use of a light and phototransistor system to read and transmit information from a binary coded tape. Other types of apparatus to which the invention is applicable are impulse telemetering systems, teletypewriters, etc.

These data transmission systems generally depend on the presence or absence of an electrical impulse or an electrical contact at a particular time or in a particular sequence to convey the information. For maximum reliability of these systems it is desirable to provide a reference channel as a check on the operation of the transmission system. In many transmission systems this added reliability is not provided because it would require an additional information channel. It is the object of this invention to provide means for attaining this additional reliability without the necessity for providing an additional information channel.

The above and other objects and features of this invention will become apparent from the following description read in conjunction with the accompanying drawing in which.

Since one aspect of the utility of the invention is its use in tank gauges, the following description will be related thereto, though it will be apparent that the invention is of broader applicability.

Figure 2:
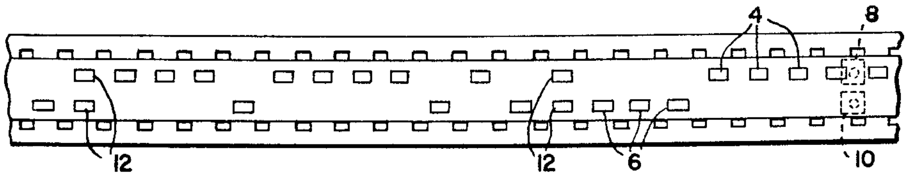
FIGURE 2 is a fragmentary view showing a form of coded tape used in a tank gauge or other apparatus for transmission purposes.

Referring to FIGURE 2, there is illustrated a form of coded film 2 which is used in a tank gauge apparatus of the type described in our above-mentioned application and, as is more fully described therein, the film 2 contains along its length in an opaque background two sets of transparent areas or openings 4 and 6. The respective series of openings 4 and 6 are associated with the photocells 8 and 10, respectively, across which they pass as indicated in FIGURE 2. The successive openings along the length of the tape are considerably exaggerated in FIGURE 2 relative to the sprocket openings, this exaggeration being for the sake of clarity. At intervals, openings of the groups 4 and 6 occur in pairs as indicated at 12. For the sake of uniformity of description it may be assumed that these paired openings 12 occur at intervals along the film corresponding to displacements of the tank float of 0.1 foot. As shown in FIGURE 2, the openings of either one or the other of the series 4 and 6 occur at regular intervals, there being one of these at each opening interval. The openings 6 may be referred to as digit openings, and the openings 4 as zero openings, as will appear apt from consideration of the binary coding system which they represent. The length of each opening in the direction of the length of the tape is the same as the spacing between successive openings. Considering both the openings and the spaces between them, the intervals between corresponding ends of pairs 12 of the openings are subdivided into twenty-four equal spaces, and consistent with what has been said, this means that the length of each opening and the length of the space between each pair of openings corresponds closely to 0.004 foot of float displacement. Between the successive sets of double openings 12, the digit and zero openings are coded to give a number corresponding to feet and tenths of feet of float height. There are eleven openings between successive sets of double openings 12. The coding which has been found most convenient for providing input to either a light panel indicator or a printing recorder is one which involves the determination of each digit of a decimal system by means of combinations of binary digits. An opening in the series 4 represents the existence of binary digit. An opening in the series 6 represents a zero for the corresponding binary digit.

In a tank gauge system involving a coded tape of the above-described type, it would be desirable to provide means having the requirements that an impulse must occur in one or the other of the channel areas 4 or 6, an impulse must occur in both channels 4 and 6 at the start of a number, and there must be eleven single impulses between double impulses. This will permit detection of substantially all the possible misoperations of the system and would provide increased reliability.

Figure 1:
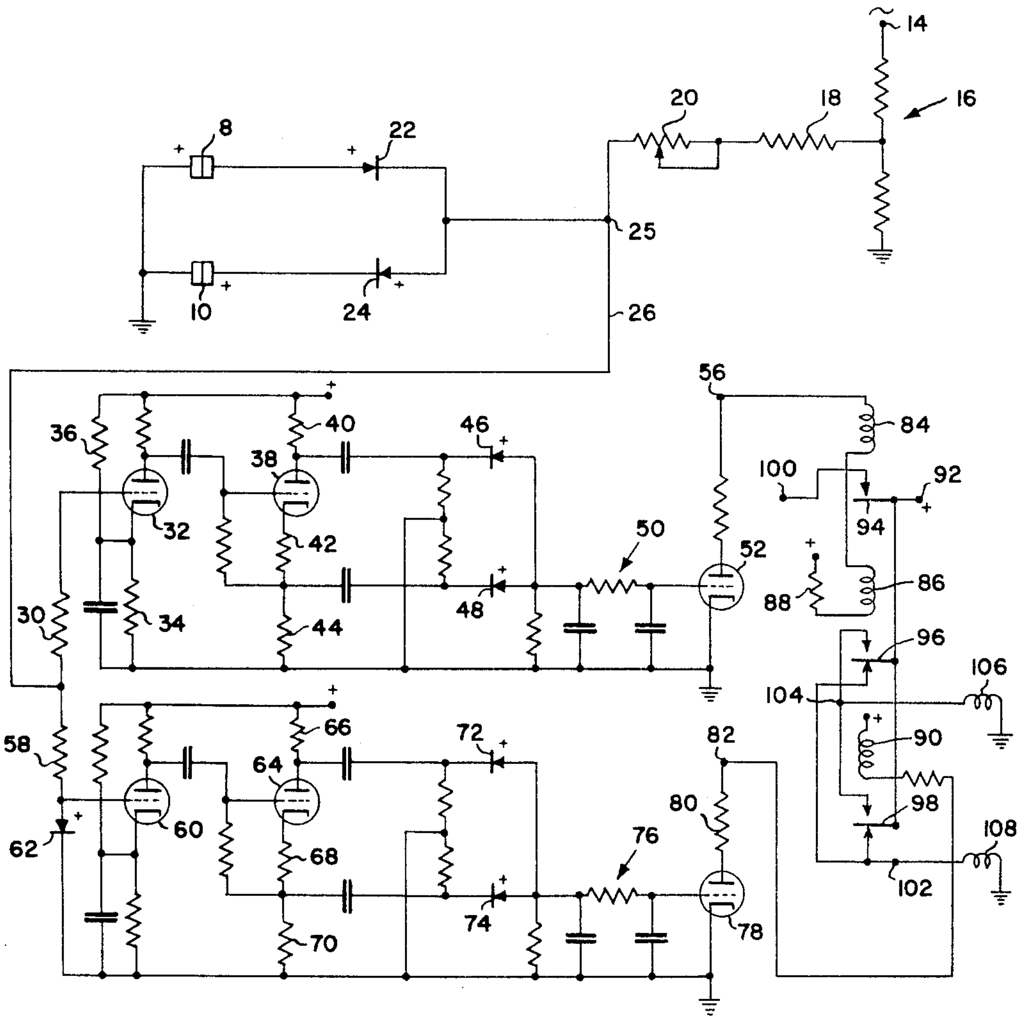
FIGURE 1 is a wiring diagram showing the signal pickup means and its associated circuitry.

The circuitry in accordance with this invention for providing this reliability is the coded pulse reading circuit shown in the drawings. The circuitry shown in FIGURE 1 is responsive to the illumination of the photocells 8 and 10. Photocells 8 and 10 are preferably phototransistors and are positioned adjacent a lamp with the coded film 2 passing therebetween so that light is directed thereon when an opening passes thereby. An alternating sixty cycle potential with respect to ground is provided at terminal 14 and through a voltage divider 16 and through the fixed and variable load resistors 18 and 20 applies a potential to a photocell and diode arrangement. The photocells 8 and 10 previously referred to are desirably phototransistors and in series with these are rectifying diodes 22 and 24 polarized to correspond to the polarization of the photocells, the diodes blocking reverse currents through the photocells. The feed to the photocell diode combinations is in parallel as illustrated so that, if illumination is present, the photocell 10 is conductive during a positive half cycle of applied voltage and the photocell 8 is conductive during a negative half cycle. The conductance of each photocell and its associated diode is so high, that, in effect, during conductive conditions they ground the terminal point 25 at the left hand end of resistor 20. As will appear in greater detail hereafter, the signals appearing at terminal point 25 may be of any one of four types. If there is no light on either photocell the signal is full wave 60 cycle. If there is light on photocell 8 and not on photocell 10 the signal is positive half wave. If there is light on photocell 10 but not on photocell 8 the signal is negative half wave. With light on both photocells there is only a small 60 cycle ripple resulting from incomplete grounding.

Means are provided for detecting the condition of the signal at the terminal point 25. This detector may be of the type described in our prior-mentioned application and is connected to the terminal point 25 by a conductor 26.

Terminal 25 is connected through conductor 26 and resistor 30 to the grid of a triode 32 which is biased to cut off (by reason of connection of its cathode to the junction of resistors 34 and 36 connected between ground and the positive supply terminal), so as to pass only positive signals appearing at its grid i.e., resulting from the full wave and position half wave type signals described. The amplified signals are fed to a second triode 38 which has an anode load resistor 40 and a pair of cathode load resistors 42 and 44, the outputs from the anode and from the junction of the cathode resistors being fed through the rectifying diodes 46 and 48 for supply through filter 50 of a negative direct potential to the grid of triode 52 which is connected through resistor 54 to the terminal 56. The two types of signals just mentioned produce cutoff of the triode 52.

Terminal 25 is also connected through conductor 26 and a resistor 58 to the grid of a triode 60, the cathode resistor of which has a low value so that this triode is normally conducting. The grid of triode 60 is connected to ground through a diode 62, polarized as indicated with its anode connected to the grid, and the result is a substantial response of the triode 60 only when the input signals are of the full wave and negative half wave types previously mentioned. The signals due to the ripple signals are negligible. The output from triode 60 is delivered to a triode 64 provided with the anode resistor 66 and the cathode resistors 68 and 70. The anode of triode 64 and the junction of the resistors 68 and 70 supply outputs to the rectifying diodes 72 and 74 which through filter 76 provide direct signals to the grid of triode 78, the anode of which is connected through resistor 80 to terminal 82. The triode 78 is cut off by the negative potential appearing at its grid when the inputs at 26 are of the full wave and negative half wave types.

The coils of two relays 84 and 86 are connected in series with a current-limiting resistor 88 between the terminal 56 and a positive potential source. The coil of a relay 90 is connected between the same or a different positive potential source and the terminal 82 with the interposition of a current-limiting resistor. A positive potential source 92 is connected to the movable contacts 94, 96 and 98 of the respective relays just mentioned. When the relay 84 is energized by illumination of cell 10 its movable contact 94 supplies positive potential to a terminal 100. When either the relay 86 or the relay 90 is de-energized, the positive potential from terminal 92 is supplied to a terminal 102. When either the relay 86 or the relay 90 is energized, the positive potential is applied to a terminal 104.

The terminal 104 is connected through the winding of a relay 106 to ground. The terminal 102 is connected through a relay 108 to ground. Since the relays 106 and 108 have fundamental functions in connection with the illumination of the photocells 8 and 10 the operation may now be described. Illumination of the photocell 10 through a digit opening 6 of the film 2 results in current flow through the coil of relay 84 and, accordingly, the appearance of a positive potential at the terminal 100. This is also true when the photocell 10 is illuminated by the passage of a pair of openings 12. Accordingly, the terminal 100 receives a positive signal upon the passage by the photocell 10 of every opening of the group 6. At all other times the terminal 100 is de-energized. Thus, the terminal 100 may be said to receive digit signals from the film openings.

The coil of relay 86 is energized whenever the coil of relay 84 is energized. The coil of relay 90, however, is energized only when the photocell 8 is illuminated, i.e., whenever there passes it an opening of the series 4, including the openings of this series occurring in a pair of openings 12. When both photocells are not illuminated, both of the relays 86 and 90 are de-energized.

Since both relays 86 and 90 are energized only upon the occurrence of the double pulses from both the digit and zero series of openings, the terminal 102 and the relay 108 are de-energized only at such times, the relay 108 at all other times being energized either through one or both of the contacts 96 and 98. The terminal 104 and the relay 106 are energized when either or both of the relays 86 and 90 are energized. Accordingly the relay 106 receives a pulse for the passage of any opening, either digit or zero, past the position of the photocells, so that the relay 106, in effect, counts each opening position along the film, including the positions of the double opening 12.

Summarizing the above, the terminal 100 provides positive signals corresponding to the digits on the film; relay 106 by its energization counts the opening positions, on the film; and relay 108 indicates by its de-energization the passage of a double opening by the photocells.

Figure 4:
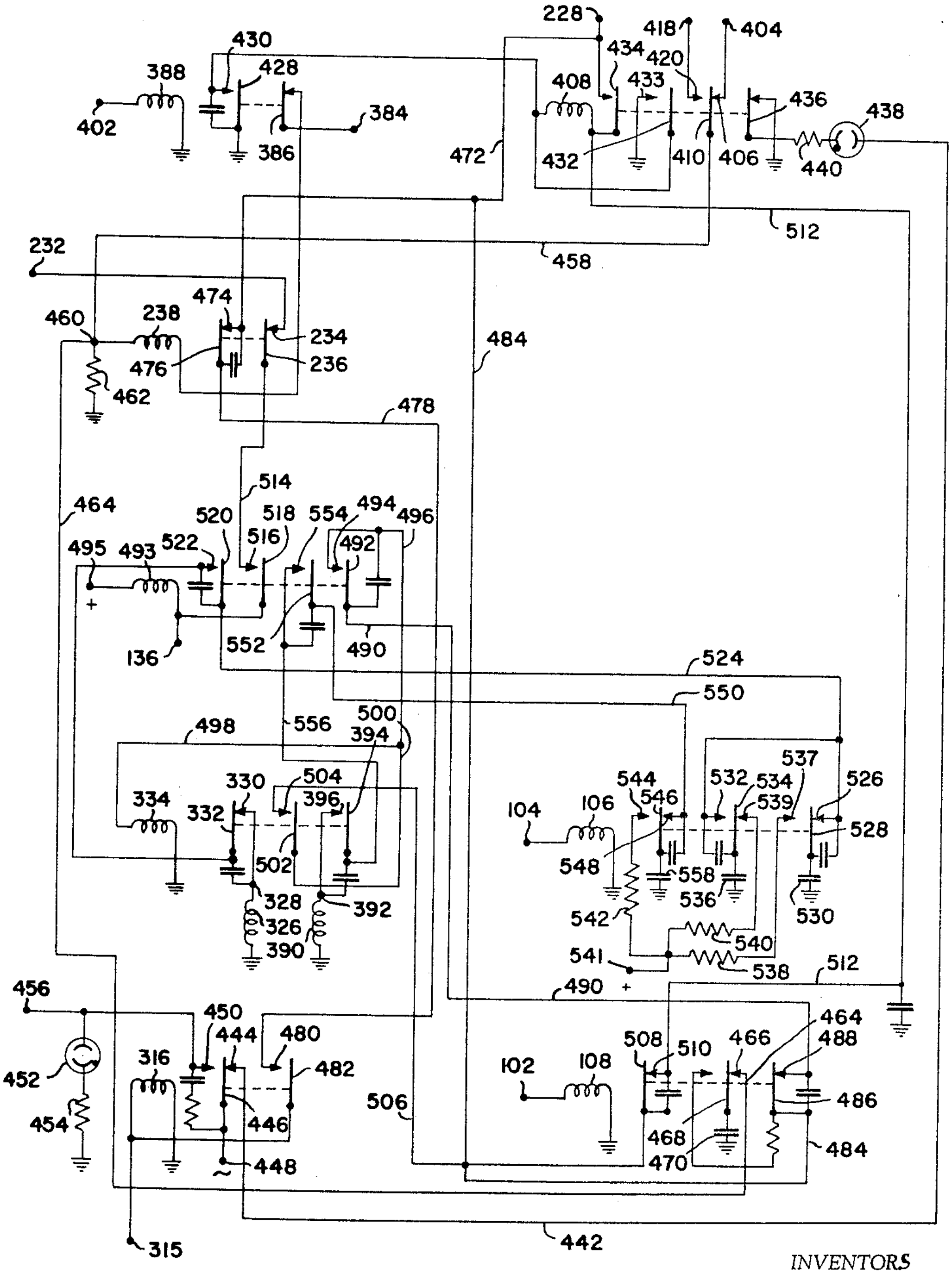
FIGURE 4 is a wiring diagram showing further control relays and their connections.
Figure 5:
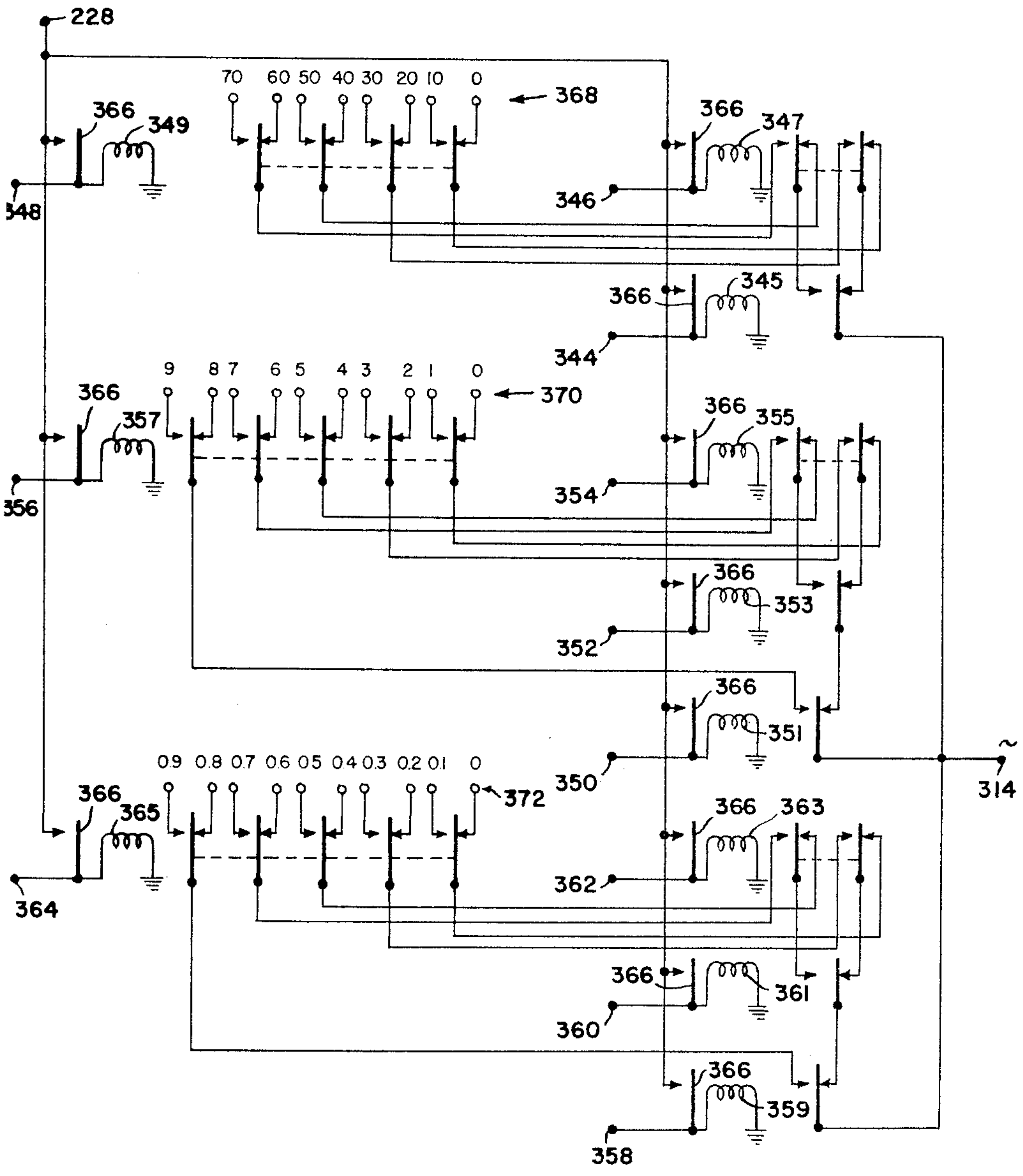
FIGURE 5 is a wiring diagram showing particularly a set of decoding relays and their connections.

The energization and de-energization of the relays may be used in conjunction with suitable apparatus to provide a reliable check on the operation of a transmission system of the type described. One form of such apparatus is disclosed in our co-pending application. The circuitry shown in FIGURES 3, 4 and 5 is the same as that of the prior-mentioned application, and for simplifying comparison, the reference numerals correspond to those used in said application.

Figure 3:
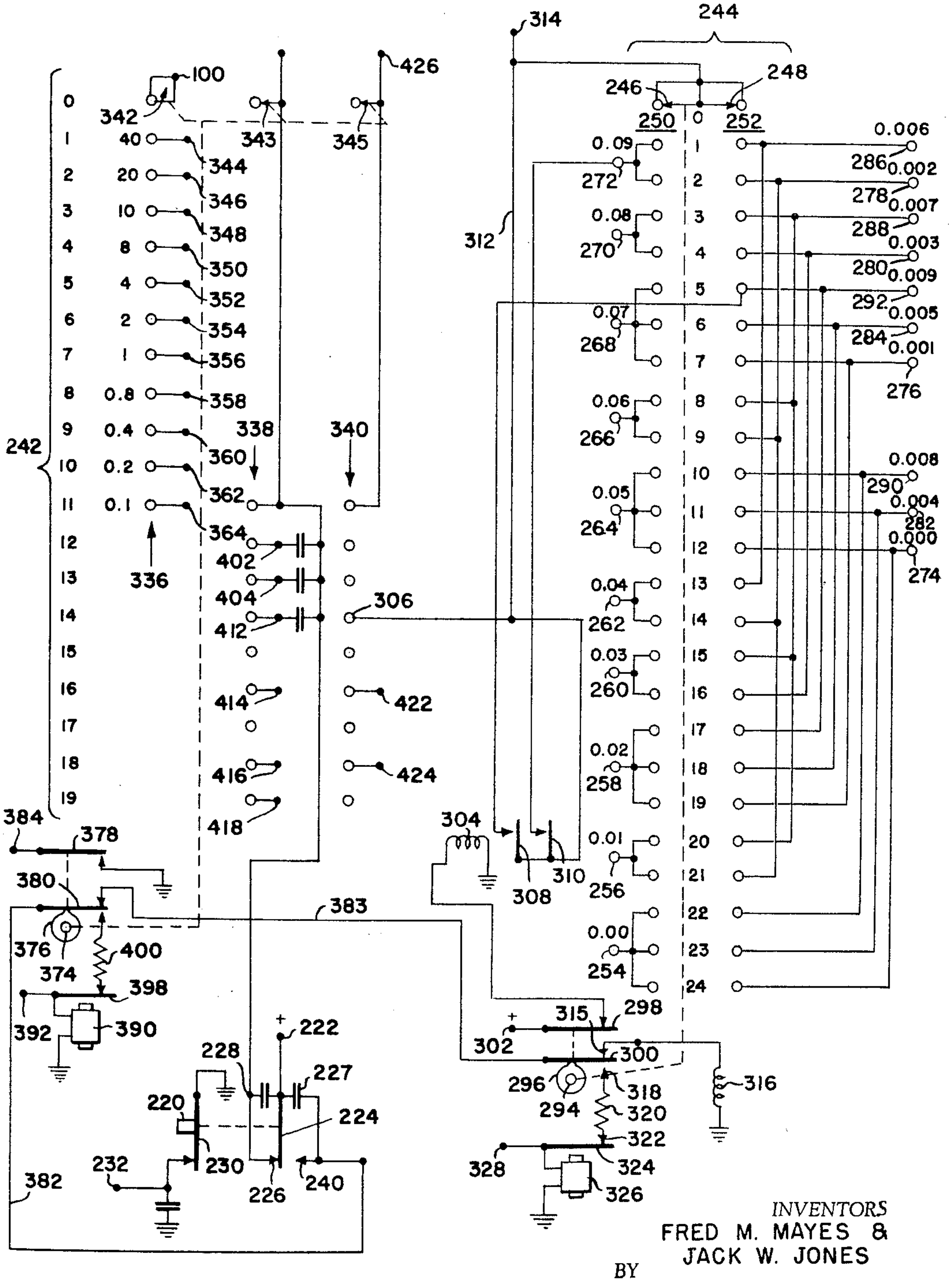
FIGURE 3 is a wiring diagram showing certain control and decoding devices and the association of the latter with inputs to indicating or recording means.

Referring to FIGURE 3, a push button control switch 220 is provided to produce recycling of stepping switches to an initial position and for restarting the cycle of operation. In its released condition it connects a positive supply terminal 222 through its movable contact 224 and fixed contact 226 to a terminal 228 from which positive potential is applied to various elements of the circuit. Where such supply is provided the numeral 228 is used as appears. When the button is in its released condition it also serves, through movable contact 230, to ground a terminal 232 which is connected to a fixed contact 234 engageable by the movable contact 236 of a relay 238 (FIGURE 4). When the button is pushed the movable contact 224 engages contact 240.

A pair of stepping switches 242 and 244 are provided to supply outputs either to a printing mechanism or to a display containing indicating lamps. The printing mechanism may be of conventional type provided with terminals which when energized in various decimal digit orders will set up the printing mechanism for the printing in conventional fashion of a record of the input.

Referring first to the stepping switch 244, this switch may be of the conventional rotary type and is provided with a pair of wiper contacts 246 and 248 respectively arranged to engage fixed contacts 250 and 252 which are illustrated in FIGURE 3 in developed position. Including the home position of the contacts 246 and 248 the switch is of a type having twenty-five (or more) contacts which are numbered in the central part of the digram of the switch. The contacts of the set 250 are connected to the terminals 254, 256, 258, 260, 262, 264, 266, 268, 270 and 272 of either a light panel or a printing machine. These terminals are respectively designated by the digital significance which they have in connection with the tank gauge disclosed in our co-pending application, the set of terminals just mentioned corresponding to hundredth digits, consistent with the other portions of the disclosure. As will be noted from the diagram the contacts 50 are connected in groups of two and three with the light panel or machine input terminals.

The right-hand set of contacts 252 are connected in various combinations with the terminals 274, 276, 278, 280, 282, 284, 286, 288, 290 and 292 of either a light panel or a printing machine, these terminals having the digital significance indicated in connection therewith, the digits in the case of these terminals corresponding to thousandths. As will appear, in the more general discussion hereafter, successive subtraction is effected in the form of complementary addition, and if there are followed the connections successively achieved by the movements of the wipers 246 and 248 to the successive contacts in numerical order it will be found that the outputs are successively 0.096, 0.092, 0.087, etc., progressing in intervals of four or five thousandths down to 0.000 corresponding to the contact at position 24. The apparatus herein specifically disclosed is designed to give a reading accuracy to the nearest 0.004 foot, and the successive steps are designed to effect this end.

The shaft which carries the wipers 246 and 248 is indicated at 294 and is provided with a homing cam 296 which acts upon a pair of movable contacts 298 and 300 to cause them to engage upper fixed contacts. The upper movable contact 298 is arranged to supply from a positive potential source 302 current through the coil of a relay 304 to connect, through movable contacts 308 and 310 of the relay the terminals 292 and 272 through line 312 to an alternating current supply terminal 314, which is also connected to both of the movable wipers 246 and 248 and to a contact 306 of the stepping switch 242. This supply terminal also appears at the right of FIGURE 5. As will appear later this terminal becomes energized at appropriate times through relay operation.

The second movable contact 300 engaged by the cam 296 provides energization for the coil of a relay 316 (FIGURE 4) through the fixed contact 315. In its released position, movable contact 300 engages the fixed contact 318 which is connected through resistor 320 to a fixed contact 322 engageable with the vibrating contact 324 which is acted upon by the driving solenoid 326 of the stepping switch, which solenoid is connected between ground and a terminal 328 which is connected, as illustrated in FIGURE 4, to a fixed contact 330 engageable by the movable contact 332 of a relay 334. The stepping switch is of conventional type in which a spring is tensioned by the solenoid 326 during a period of energization thereof and effects advance of the shaft 294 step by step each time the solenoid is deenergized. As will hereafter appear, the stepping switch 244 is originally in its home position, and is then advanced step by step in the cycle of operation to an extent determined by pulses originating in the coded film. After the operational cycle is completed, homing is effected by the vibration of the armature contact 324, the switch finally coming to rest in its home position as determined by engagement of the cam 296 to raise the contact 300 out of engagement with contact 318.

The stepping switch 242 is provided with three series of contacts 336, 338 and 340 and is also of the rotary type in which these series of contacts are engaged respectively by the wipers 342, 343 and 345. As in the case of the other relay which has been described, the positions of the contacts are numbered at the left of FIGURE 3, the home contacts being designated at zero.

Referring now to FIGURE 5 in conjunction with the diagram of stepping switch 242, it will be noted that the first eleven contacts 336 are connected to terminals 344, 346, 348, 350, 352, 354, 356, 358, 360, 362 and 364 which in FIGURE 5 are shown as the respective terminals of the coils of relays 345, 347, 349, 351, 353, 355, 357, 359, 361, 363 and 365. These relays have relatively elaborate contact systems as shown, and, in fact, physically some of these relays may be made up of pairs of relays having their coils wound in parallel. The contacts of the series 336 correspond to the decimal digital values indicated in association therewith.

The contacts in positions 1, 2 and 3 are thus indicated as having the assigned values 40, 20 and 10. Referring to the set of relays 345, 347 and 349, it will be found that when these relays are respectively individually energized, the input from the terminal 314 will be respectively delivered to the terminals of the of the series 368 which are assigned the values 40, 20 and 10, and if combinations of the relays 345, 347 and 349 are energized, the outputs to the terminals 368 will correspond to the sum of the assigned values for the input terminals of the relays. Thus by combinations of energization of these three relays, there are secured digits in the tens places running from zero to seven, the digit being zero when all three relays are deenegized. The terminals indicated at 368 are input terminals of the tens bank of the light panel or printer. It will be noted that each of the relays shown in FIGURE 5 has a holding contact 366 which is normally open but, when the corresponding relay coil is energized serves to maintain the energization of the coil from the supply terminal 228. (It may be here noted that all of the contacts in FIGURE 5 are shown in the positions assumed when the relay coils are deenergized, the same being true of the relays shown in FIGURES 3 and 4.)

The relays 351, 353, 355 and 357 form another group which supply inputs in the units positions in the light panel or printer, the terminals being indicated at 370. By following the connections shown in association with this group of relays, it will be evident that the relays 351, 353, 355 and 357 correspond to the digits 8, 4, 2 and 1. In the case of relay 351 this may only be associated with the relay 357 to give rise to the digits 8 and 9. The other relays are arranged to be associated as described above, and will then give the digits running from zero to seven.

The third set of relays 359, 361, 363 and 365 correspond precisely to those just discussed, and the connections are the same to give the digits in the tenths positions to the light panel or printer input terminals indicated at 372.

The arrangements described may be of course be extended as desired, the description here applying to a gauging system capable of measuring depths ranging up to eighty feet, and hence the uppermost relay arrangement in FIGURE 5 is only carried out to the extent of providing an output of seventy.

As will apepar hereafter, what has just been described serves for the decoding of the coded openings in the 0.1 foot intervals of the film.

The shaft which carries the wipers 342, 343 and 345 of the stepping relay 242 is indicated at 374 and carries a homing cam 376 which acts upon the movable contacts 378 and 380 to cause them to move to upper positions. The contact 380 is connected through line 382 to the contact 240 of the push button switch already described. In its upper position it makes connections through 383 with the movable contact 300 of the stepping switch 244.

The movable contact 378 is connected to terminal 384 which is in turn connected to the movable contact 386 of the relay 388 (FIGURE 4). When released by the cam 376 it makes contact with ground.

The stepping solenoid 390 is connected to terminal 392 which is connected to the fixed contact 396 engageable by the movable contact 394 of relay 334 previously referred to. The vibrating contact 398 which engages a fixed contact connetced through resistor 400 to a fixed contact engageable by movable contact 380 when the latter is released by cam 376 provides for homing of the relay 242.

Referring to the contacts of the series 338 of stepping relay 242, that in position 11 is inactive, being connected, for convenience, to wiper 343. The contact in position 12 is connected to terminal 402 of relay 388. The contact in position 13 is connected to a terminal 404 which is connected to a normally closed contact of a relay 408 engaged by the movable contact 410. The contact is connected to terminals 412, 414 and 416 in positions 14, 16 and 18, respectively. The contact in position 19 is connected to terminal 418, which is in turn connected to the normally open contact 420 engageable by the movable contact 410 of relay 408.

In the series of contacts 340 of stepping relay 242, that, 306, in position 14 has already had its connections described. The contact in position 16 is connected to a terminal 422 of the printer, energization of which effects adding. The contact in position 18 is connected to a terminal 424 of the printer, energization of which effects totaling and printing. The terminal 426 connected to wiper 345 is a current supply terminal providing for the energizing of the contacts of this series.

A movable contact 428 of relay 388 engages fixed contact 430 to ground the left-hand end of the coil of relay 408 when the relay 388 is energized. The left-hand terminal of the coil of relay 408 is also grounded when it is energized by engagement of movable contact 432 with the fixed contact 433. When the coil of relay 408 is energized its movable contact 434 connects its right-hand terminal to terminal 228.

The movable contact 436 of relay 408 grounds the circuit including resistor 440 and neon bulb 438 when the relay 408 is deenergized. The connection 442 from the neon bulb connects it with the fixed contact 444 which, when relay 316 is deenergized, is engaged by movable contact 446 which is connected to the alternating supply terminal 448. When the relay 316 is energized the movable contact 446 engages the fixed contact 450 to supply current to the series arrangement of neon bulb 452 and resistor 454 and also to the terminal 456 which serves to energize the motor which causes movement of the film, the clutch solenoid for the driving means and the lamp opposite the photocells 8 and 10, as is more fully described in our prior application. The means for actuating the film through its readout movement may be of any suitable type such as the motor driven sprocket arrangement comprising a solenoid clutch disclosed in our co-pending application.

The movable contact 410 of relay 408 is connected through line 458 to the left-hand terminal 460 of the winding of relay 238, this terminal being also connected to ground through resistor 462. A connection 464 from the terminal 460 runs to the fixed contact 466 which is engaged by the movable contact 468 of relay 218 when that relay is deenergized. A capacitor 470 is connected between contact 468 and ground.

The terminal 228 is connected at 472 with the fixed contact 474 engageable by the movable contact 476 when the relay 238 is deenergized. The movable contact 476 is connected at 478 to the fixed contact 480 engageable by the movable contact 482 when relay 316 is energized. The movable contact 482 is connected to terminal 315.

The terminal 228 is connected through 484 with the movable contact 486 which, when relay 218 is energized, engages the fixed contact 488 which is connected at 490 to the movable contact 492 which, when relay 493 is energized engages the fixed contact 494 which is connected at 496 to the left-hand terminal of the winding of relay 334 (through connection 498) and, through connection 500, to the movable contact 502 of relay 334 which, when the relay is energized, engages the fixed contact 504 connected at 506 to the movable contact 508 of relay 218 which, when this relay is deenergized, engages the fixed contact 510 which is connected through line 512 to the right-hand terminal of the winding of relay 408.

The winding of relay 493 is connected between the terminal 136 and a positive potential supply terminal 495.

A connection 514 joins the movable contact 236 of relay 238 to the fixed contact 516 which, when relay 493 is energized, is engaged by the movable contact 518 which is connected to the terminal 136.

A movable contact 520 of relay 493 engages, upon energization of this relay, the fixed contact 522 which is connected to the movable contact 332 of relay 334. The movable contact 520 is connected at 524 to the fixed contact 526 engageable by the movable contact 528 when relay 106 is deenergized. The last mentioned movable contact is connected to ground through a capacitor 530. The connection 524 also runs to the fixed contact 532 which is engaged by movable contact 534 when the relay 106 is energized, the contact 534 being connected to ground through a capacitor 536. Contacts 537 and 539 which are respectively engaged by the contacts 528 and 534 when the relay 106 is energized and deenergized are respectively connected to resistors 538 and 540 which are connected to a positive supply terminal 541 to which there is also connected a resistor 542 extending to a fixed contact 544 which is engageable by a movable contact 546 when relay 106 is energized. When the relay is deenergized, the contact 546 engages the fixed contact 548 which is connected at 550 to the movable contact 552 of relay 493 which, when this relay is energized, engages the fixed contact 554 connected at 556 to the movable contact 394 of relay 334. Movable contact 546 is connected to ground through a capacitor 558.

Operation of what has been described is initiated by the pressing of push button 220 which serves to isolate the movable contact 230 from terminal 232 and to release movable contact 224 from fixed contact 226 and to engage it with fixed contact 240.

The opening of contact 232 prevents the possibility that relay 493 may become locked during depression of the button.

At this time the stepping relays 242 and 244 will ordinarily be out of their home positions and the push button is held pressed until both of these stepping switches return to home positions in the following fashion:

When stepping switch 242 is out of its home position, the contact 380 engages the lower fixed contact which is connected through resistor 400 to the fixed contact of the vibrator 398. The positive supply from terminal 222 is connected through 224 and 240 and line 382 so that the solenoid 390 of the stepping switch is energized. This produces a break of contact at 398 so that vibration occurs resulting in the stepping as heretofore indicated of the shaft 374 until the cam 376 engages contact 380 to move it to its upper position. The stepping of the shaft 374 then stops. When this home position is reached the connection 383 is energized with a resulting similar homing action of the shaft 294 of the stepping switch 244. Finally, the cam 296 moves contact 300 to its upper position with resulting energization of the coil of relay 316. The initial energization of the coil of relay 316 causes engagement of contacts 482 and 480 which through connection 478 and the normally closed contacts 476 and 474 of relay 238 is connected through line 472 to the supply terminal 228. Thus the relay 316 is locked in its energized position wherein it supplies current from terminal 448 to the motor and clutch solenoid of the film actuating means and the photocell lamp, the latter being energized through a transformer. The locking action is actually completed only when the push button is released. Only then is the terminal 228 connected to the supply terminal 222, but during the transient actions occurring during release the current flow through capacitor 227 which bridges the contacts 224 and 240 maintains the relay energized.

The energizing of relay 316 results in the following besides the supplying of power to the motor relay and lamp:

The neon lamp 452 is energized indicating that the apparatus is beginning its cycle of operation.

It may be remarked that relay 316 remains energized ordinarily until step 19 of stepping switch 242 occurs involving engagement of wiper 343 with the contact connected to terminal 418. Accordingly, for each readout there is a movement of the film an amount of at least the space between double pulses as well become apparent hereafter.

Suitable means, such as the float responsive circuit disclosed in our co-pending application, or a suitable relay means, may be provided for causing energization of relay 493 through terminal 136 at the start of the cycle of operation. Once energized, the relay 493 remains energized through the closure of contacts 516 and 518 which are connected through the normally closed contacts 234 and 236 of relay 238 to the terminal 232 which when push button 220 is in released position is connected to ground as shown in FIGURE 3.

Stepping switch 244 is now advanced one step upon the passage by the photocells of both the beginning and end of each opening or pair of openings therein. It has been pointed out that the relay 106 is energized once for each passage of an opening. The arrangement of contacts of this relay and their associated capacitors results in an effective doubling of the number of pulses imparted to effect stepping by the energization of the solenoid 326. From FIGURE 3 it will be noted that the ungrounded terminal of solenoid 326 is connected through the normally closed contacts 330 and 332 of relay 334 to the contacts 520 and 522 which are closed upon energization of relay 493 and through connection 524 to the fixed contacts 526 and 532 of relay 106. The contact 526 is engaged by movable contact 528 when relay 106 is deenergized, whereas contact 532 is engaged by movable contact 534 when the relay 106 is energized. The movable contacts just mentioned are respectively connected to the ungrounded terminals of capacitors 530 and 536. It will be noted that the respective movable contacts 528 and 534 are located in capacitor-charging positions when the relay is respectively energized and deenergized, charging being effected through the resistors 538 and 540 from the supply terminal 541. The result is that both upon energization and upon deenergization of the relay 106 capacitor discharges occur through the stepping solenoid 326. Thus, from the standpoint of overall operation, both the beginning of an opening and the end of an opening in the film produces a advance of the stepping switch 244. These advances continue until a double opening reaches the position of the photocells, there being an advance when this occurs. The occurrence of a pair of pulses by reason of openings 12 effects deenergization of relay 108 as already mentioned. The result of this is the closing and locking of relay 334. The closing occurs through the sequence of connections 498, 496, 494, 492, 490, 488, 486, 484 and 472 leading to the terminal 228. The locking is effected upon energization of this relay through 498, 500, 504, 506, 484 and 472 leading also to terminal 228. The energization of the relay then closes the stepping circuit to the solenoid 390 of stepping switch 242 through the connections 396, 394, 556, 554, 552, 550, 548 and 546, the last being a movable contact connected to the ungrounded terminal of capacitor 558. The alternative position of contact 546 is in engagement with fixed contact 544 which is connected through resistor 542 to the positive supply terminal 541. As the relay 106 is energized by the passage of any opening by the photocells, the capacitor 558 is charged and becomes discharged through the relay coil 390 when the relay 216 is deenergized. Steps are thus imparted to the stepping switch 242, once for every opening position on the film. As the steps take place contacts are made with the contact points 336 by the brush 342 which is energized from the terminal 206 upon the passage by the photocell of the digit openings. The connections previously described to the relay arrangements shown in FIGURE 5 thus enter into the relay arrangement the digital values corresponding to the openings in the film, which values are retained in the arrangement of FIGURE 5 by reason of the locking of the various relays.

The results of the stepping actions may be summarized as follows:

Starting effectively from a numerical value of 0.100, each step of relay 244, corresponding to the beginnings and endings of the film openings, has subtracted 0.004 or 0.005 foot, the stepping terminating with that step corresponding to the entry of a double opening into the position of the photocells. The result is energization of the terminals of the groups 254–272 and 274–292 to give hundredths and thousandths digits to be added to tens, units and tenths digits for a complete indication.

During the eleven steps of relay 242, the binary-decimal outputs resulting from passage of the digit openings by the photocell position have set up the relays shown in FIGURE 5 to energize the tens, units and tenths terminals 368, 370 and 372 to correspond to the coding in the film interval scanned.

Thus, at the completion of the eleventh step of relay 242 the energization either for lamp indication or for printing machine operation should be fully set up.

Provision is made for avoiding an error under a special condition which might arise. If a double opening was presented to the photocells at the time stepping would ordinarily be initiated, the relay 244 would not be stepped but stepping of relay 242 would occur. Under such circumstances the ultimatae indication of level would be deficient by 0.1 foot. To insure against this possibility, relay 304 is energized when relay 244 is in its home position, through the closure of the circuit from terminal 302 by contact 298, and consequently contacts 308 and 310 are closed with the result that terminals 272 and 292 are energized for the ultimate result of adding 0.099 foot to the reading otherwise resulting from the stepping of relay 242. However, when relay 244 is out of homing position relay 304 is deenergized and contacts 308 and 310 are open.

On the twelfth step of relay 242 a test is made for the occurrence of a double opening 12. Contact 343 then is connected with terminal 402 energizing relay 388. Movable contact 428 engages fixed contact 430 grounding the left-hand end of the coil of relay 408. Opening of contact at 386 opens the ground connection of relay 238 which previously existed through 386, 384 and 378. This prevents relay 238 from being energized on step twelve. If a double pulse occurs as it should on this step, relay 108 will be deenergized causing engagement between contacts 508 and 510 energizing relay 408 through the connections 228, 472, 484, 508, 510 and 512, the left-hand end of the coil of relay 408 having been grounded as just described. Relay 408 is locked to ground through 432 and 433. On the supply side the locking is effected by closure of contact at 434.

Thus the appearance of a double opening 12 causes relay 408 to lock in energized condition. The result is to cause contact 410 to leave contact 406 and engage contact 420. The ground connection of neon lamp 438 through resistor 440 and contact 436 is opened so that when relay 316 is deenergized the neon lamp will not glow.

If a double pulse does not occur on the step twelve, relay 218 is not deenergized and consequently relay 408 is not energized. The result then is continued engagement between 406 and 410 and continued grounding of neon lamp 438 through resistor 440 and contact 436. Then on the thirteenth step relay 238 would be energized from wiper 343 through 404, 406, 410 and 460 and the ground connections 386, 384 and 378. The result would then be breaking of the locking circuit for relay 316 by opening of the contact at 474, 476. The locking circuit of relay 493 would also be opened by the opening of contacts 234 and 236 to break its ground circuit. Neon lamp 438 would then glow indicating an error in operation.

If a double pulse properly occurs on step twelve, then nothing occurs on step thirteen, the connection between contacts 404 and 406 being open.

The use of a double pulse as a check on operation also occurs if the double pulse occurs at any other step of switch 242 between 0 and 12 except 0 and 12. If a double pulse thus incorrectly occurs, relay 108 is deenergized and capacitor 470 discharges through the coil of relay 238, energizing it and thereby deenergizing relays 493 and 316 to stop the mechanism.

Steps fourteen to nineteen of relay 242 are involved in the output either to indicating lamps or to a printer and form no part of the present invention.

While a particular specific embodiment of the invention has been described, it will be evident that various sequences involved in the operation may be changed without departing from the fundamental aspects of the invention. Accordingly, it will be understood that the invention is not to be regarded as limited except as required by the accompanying claims.

What is claimed is:

1. A data transmission system comprising a first transducer means responsive to information on a first channel, a second transducer means responsive to information on a second channel, first circuit means connecting one side of said first transducer means to a terminal and the other side to ground, second circuit means connecting said second transducer means in parallel with said first transducer means, means providing an alternating potential to said terminal, first rectifying means connected in series with said first transducer means for permitting the passage through said first circuit means of only the positive portion of said alternating potential, second rectifying means connected in series with said second transducer means for permitting the passage through said second circuit means of only negative portions of said alternating potential, and means for detecting the signal at said terminal.

2. A data transmission system comprising a first photoelectric transducer means responsive to information on a first channel, a second photoelectric transducer means responsive to information on a second channel, first circuit means connecting one side of said first transducer means to a terminal and the other side to ground, second circuit means connecting said second transducer means in parallel with said first transducer means, means providing an alternating potential to said terminal, first rectifying means connected in series with said first transducer means for permitting the passage of only the positive portion of said alternating potentials through said first circuit, second rectifying means connected in series with said second transducer means for permitting the passage of only negative portions of said alternating potential through said second circuit, and means for detecting the signal at said terminal.

3. A data transmission system comprising a first transducer means responsive to information on a first channel, a second transducer means responsive to information on a second channel, first circuit means connecting one side of said first transducer means to a terminal and the other side to ground, second circuit means connecting said second transducer means in parallel with said first transducer means, means providing an alternating potential to said terminal, first diode rectifying means connected in series with said first transducer means for permitting the passage of only the positive portion of said alternating potentials through said first circuit means, second diode rectifying means connected in series with said second transducer means for permitting the passage of only negative portions of said alternating potential through said second circuit means, and means for detecting the signal at said terminal.

4. A data transmission system comprising a first photoelectric transducer means responsive to information on a first channel, a second photoelectric transducer means responsive to information on a second channel, first circuit means connecting one side of said first transducer means to a terminal and the other side to ground, second circuit means connecting said second transducer means in parallel with said first transducer means, means providing an alternating potential to said terminal, first diode rectifying means connected in series with said first transducer means for permitting the passage of only the positive portion of said alternating potentials, second diode rectifying means connected in series with said second transducer means for permitting the passage of only negative portions of said alternating potential, and means for detecting the signal at said terminal.

5. A data transmission system comprising first sensing means for providing signals in accordance with information on a first channel of a coded record, second sensing means for providing signals in accordance with information on a second channel of the coded record, and means responsive to the energization of said first and second sensing means and including a source of alternating potential for providing a full wave signal if neither of said sensing means is energized and a positive half wave signal if one of said sensing means is energized.

6. A data transmission system comprising first sensing means for providing signals in accordance with information on a first channel of a coded record, second sensing means for providing signals in accordance with information on a second channel of the coded record, and means responsive to the energization of said first and second sensing means and including a source of alternating potential for providing a full wave signal if neither of said sensing means is energized and positive half wave signal if one of said sensing means is energized, a negative half wave signal if the other of said sensing means is energized, and a small ripple signal if both of said sensing means are energized.

7. A data transmission system comprising means providing differentiated groups of coded markings on two channels, means responsive to said markings and providing, by relative movement between said markings and said responsive means, sequential output signals, said sequential output signals representing that a marking occurred on one of said channels, a marking occurred on the other of said channels, or that a marking occurred on both of said channels, means receiving said sequential output signals for decoding the same, said last-mentioned means including means counting said markings and translating at least one complete group of markings into a decimal output, and means responsive to the operation of said counting and translating means to indicate whether or not (1) an output signal occurred in one or the other of said channels for a predetermined number of sequential output signals comprising said group, (2) an output occurred in both channels is at the start of said predetermined number of sequential outputs, and (3) the correct number of predetermined output signals occurred.

References Cited by the Examiner

UNITED STATES PATENTS

| | | | |
|---|---|---|---|
| 2,600,817 | 6/1952 | Victoreen | 235—61.11 |
| 2,782,398 | 2/1957 | West et al. | 235—61.115 X |
| 2,933,245 | 4/1960 | Fitch et al. | 235—61.11 |
| 2,958,727 | 11/1960 | Barbeau et al. | 178—23 |
| 3,102,253 | 8/1963 | Blodgett | 340—46.1 |
| 3,108,253 | 10/1963 | Blodgett et al. | 340—46.1 |

MAYNARD R. WILBUR, *Primary Examiner.*

MALCOLM A. MORRISON, *Examiner.*

D. W. COOK, *Assistant Examiner.*